(12) United States Patent
Jacobsen

(10) Patent No.: US 8,704,066 B2
(45) Date of Patent: Apr. 22, 2014

(54) REMOVABLE FRETBOARD STICKERS WITH MUSICAL INDICIA

(76) Inventor: David Christopher Jacobsen, San Diego, CA (US)

( * ) Notice: Subject to any disclaimer, the term of this patent is extended or adjusted under 35 U.S.C. 154(b) by 0 days.

(21) Appl. No.: 12/981,252

(22) Filed: Dec. 29, 2010

(65) Prior Publication Data

US 2012/0167746 A1 Jul. 5, 2012

(51) Int. Cl.
*G09B 15/06* (2006.01)
(52) U.S. Cl.
USPC ..................................... 84/477 R; 84/485 R
(58) Field of Classification Search
USPC ....................................................... 84/477 R
See application file for complete search history.

(56) References Cited

U.S. PATENT DOCUMENTS

| 3,978,756 | A | * | 9/1976 | Feldman | 84/470 R |
| 4,712,464 | A | * | 12/1987 | Nance | 84/485 R |
| 5,345,851 | A | * | 9/1994 | Aalfs | 84/315 |
| 5,945,618 | A | * | 8/1999 | Bennett | 84/477 R |
| 2005/0126368 | A1 | * | 6/2005 | Harrison | 84/471 R |
| 2009/0266223 | A1 | * | 10/2009 | Tashima | 84/485 R |

* cited by examiner

*Primary Examiner* — Christopher Uhlir

(57) ABSTRACT

The present invention is a device and method for teaching note locations, fretboard patterns, scales, and chords on the fingerboard of a fretted stringed instrument ("fretboard"), such as an electric or acoustic guitar. The invention comprises a set of independently affixable fretboard adhesive labels ("stickers") that adhere to the surface of the stringed instrument, using a mild adhesive, so as not to damage the instrument, and a number of markings, which indicate musical indicia. The device is applied to the instrument by slipping the various individual stickers between the corresponding frets and strings of the stringed instrument and affixing the stickers directly to the fretboard.

13 Claims, 4 Drawing Sheets

REMOVABLE FRETBOARD STICKERS WITH MUSICAL INDICIA

FIELD OF THE INVENTION

The present invention relates to the field of teaching aids for stringed instruments.

BACKGROUND

All stringed instruments share a number of common features: sound holes, a sound box, a fretboard or fingerboard, a neck, a nut, a head, tuning pegs, a bridge, and of course strings. In the case of fretted stringed instruments, the fingerboard further contains "frets," which are raised bars that transverse the fingerboard at various intervals parallel to the bottom of the instrument. The challenge of all would-be guitar players is essentially the same: learning to skillfully play various "notes", "chords", "phrases", and "patterns" by manipulating the strings of the instrument of choice.

To play one "note" on a stringed fretted instrument, one must cause one of its many strings to vibrate at one of its possible frequencies or "pitches". To select the pitch and corresponding note to be played, the player depresses the string on the fretboard between two frets, causing the length of the string that is vibrating when plucked to change. When the length of the portion of a given string that is vibrating changes, the frequency of the sound wave emanating also changes which forms the pitch of the note being played. Because each fret is placed at a different length from the bridge pin (the device which holds each string in place), the player can play a variety of notes by depressing the string between different frets before plucking the string.

While learning how to cause strings to vibrate in a manner that is sufficiently pleasing to the ears to pass as "music" may be achieved by a variety of means, a number of common devices are typically employed. Mnemonic devices are often used to teach students the names of sequences of notes and to memorize which notes are needed to form various "chords," which are combinations of various singular notes played at the same time. And visual cues such as fretboard diagrams, are often used to teach students where to place their fingers in order to produce various notes.

Although there are a number of books, videos, and online resources devoted to providing students with visual cues needed to learn the fundamental skills required to learn a stringed instrument, most of these learning aids share a common deficiency: the fretboard patterns, note locations, or chords to be learned are printed on something other than the fretboard of the guitar itself. This forces students to expend a great deal of mental effort in order to figure out how the fretboard patterns, note locations, or chords to be learned, as printed on the visual cue, correspond to the actual instrument being used. The present invention seeks to eliminate this shortcoming by offering students a set of visual cues that can be affixed directly to the surface of the fretboard.

A variety of devices, besides the present invention, have been employed to attempt to affix visual cues directly to the surface of the fretboard. However, all of the devices existing in the prior art have significant shortcomings, making them ineffective or otherwise unattractive to use.

Some devices have a one-piece sheet of pliable material, such as linen, muslin, or aluminum, extending along the length of the fretboard, having fret openings cut throughout the material, which can be secured to the sides of the fretboard using pins. This type of visual cue device, while offering a means to place the lessons to be learned right on the fretboard, is cumbersome and potentially damaging to the instrument. Moreover, because the invention is a one-piece sheet of material, the openings cut throughout the material must be fairly large to accommodate the frets, given that the frets are spaced differently on different types of guitars. This limits the size of printing space. More importantly, because the invention is comprised of one continuous piece of material, the student must either cover the entire fretboard at once or else forgo using the learning device entirely. This is problematic because in some instances it is beneficial for students to deprive themselves of visual cues when unnecessary in order to challenge themselves to allow their brain to do the work otherwise done by the visual cue. Therefore, there are a great number of instances in which it is beneficial to allow student to apply visual cues to some frets but not others.

Other devices have a sheet of autogenously adhesive plastic, such as cling vinyl, on which is printed a series of markers indicating note locations, scales, or chords. These devices are cumbersome to apply, require students to cover the entire fretboard or else forgo using the device entirely, and hamper natural contact between the guitar player's thumb and the back of the guitar neck, since they must cover the entire guitar neck in order to adhere to themselves. This later drawback is significant, since guitar players must constantly slide their thumb up and down the guitar neck in order to play various chords and notes. Thus, these devices threaten optimal playing ability while reinforcing in students' mind and muscle memory incorrect assumptions about the friction levels of the back of the guitar neck.

Other devices have a series of cards which can be alternately placed on the fretboard of the guitar and then withdrawn after the fingers are placed in the proper positions. The lack of permanency of the visual cue requires students to continually stop instrument play to put the relevant card on the fretboard whenever information is needed. This drawback alone is sufficient to make these devices virtually worthless to students trying to learn long musical phrases and complex fretboard patterns.

While a number of other methods and devices have been developed for indicating fretboard patterns, note locations, and chord locations on the surface of the fretboard of stringed instruments, all methods and devices existing in the prior art have significant drawbacks. These methods and devices either require permanent changes to the instrument, interfere with proper play, do not teach note names, must cover the entire fretboard to be used at all, or else embody some other discouraging shortcoming. Accordingly, what is needed is a visual cue learning device that can be temporarily fixed to the fretboard of the guitar, fret-by-fret, without damaging the guitar surface. The present invention meets this need.

SUMMARY OF THE INVENTION

The present invention is comprised of a set of individually removable, low-tack fretboard stickers, which may be adapted for use with all fretted stringed instruments, including but not limited to guitars, bass guitars, banjos, ukuleles, and which may be used to teach students to recognize the locations of notes, fretboard patterns, chords, scales, and other important fundamental musical concepts required to learn to play stringed fretted instruments. The removable fretboard sticker set comprises a set of flat, thin, low-tack or mildly adhesive stickers, with markings of musical indicia printed on them, which indicate musical concepts such as the names and locations of various notes when placed between the appropriate frets of the stringed instrument and the strings of the guitar.

Each sticker in the sticker set may be applied to the surface of the fretboard individually, or in groups or sets, including the entire set and may be removed individually as well. This allows the greatest level of flexibility in designing teaching methods that implement the sticker sets as visual aids.

Each sticker can be individually applied by sliding it underneath the strings of the instrument, aligning the markings directly underneath the strings, and firmly pressing the sticker to the surface of the instrument, causing it to temporarily adhere. The sticker is only wide enough to cover the surface of the fretboard and attach to the sides of the neck, allowing the player of the instrument to make natural contact with the instrument at the back of the neck.

Given recent developments in adhesives technology, there are a number of low-tack adhesives that can be applied to the surface of standard stringed instrument substrates and removed without doing any damage to the surface of the instrument. Such adhesives are incorporated into the preferred embodiment of the present invention, to avoid damaging the instrument's substrate. Depending on the type of adhesive used, the stickers may also be removed and reapplied when needed, allowing them to be repositioned and, in some cases, reused.

The complete sticker set has printed markings on it before being applied to the surface of the instrument. These markers can be used for a variety of purposes. In a preferred embodiment, they may include musical indicia that indicate musical concepts such as the names and locations of notes, the positions of root notes, chords, scales, including, in some cases, notes NOT to be played in various keys or musical modes. The markings may be printed on the stickers in a variety of colors and may contain numbers, alphanumericals in a variety of languages, or any other appropriate type of marking useful in accomplishing the goals of the teaching device. Furthermore, the markings of the stickers may be used in conjunction with sheet music, or other external visual cues, including note names and other helpful information. Furthermore, it is contemplated that the musical indicia of the stickers may communicate musical concepts needed to learn entire songs.

The primary object of the present invention is to create useful low-tack visual devices to aid students in learning the location of various important musical concepts and features on the fretboard of stringed instruments.

A further object of the present invention is to provide a learning device for teaching students of stringed instruments that indicates the location of individual notes to be played in a way that is easily ascertained.

A further object of the present invention is to provide a learning device for teaching students of stringed instruments that is easily applied to and removed from the surface of the chosen instrument.

A further object of the present invention is to provide a learning device for teaching students of stringed instruments that can be adapted to a wide variety of teaching methods, including those requiring fret-by-fret visual cues.

A further object of the present invention is to provide a learning device or system of devices for teaching students of stringed instruments that does not interfere with the natural feel and play of the instrument.

A further object of the present invention is to provide a learning device or system of devices for teaching students of stringed instruments that does not prevent normal contact with the back of the neck of the stringed instrument.

A further object of the present invention is to provide a learning device or system of devices for teaching students of stringed instruments that can be flexibly accommodated to a variety of standard sized instruments.

Other objects, advantages, and novel features of the present invention are set forth in part in the detailed description to follow, taken in conjunction with the accompanying drawings. Further objects, advantages, and novel features may be learned by practice of the invention. The objects and advantages of the present invention may also be realized and attained by means of the appended claims.

BRIEF DESCRIPTION OF THE DRAWINGS

Figure 1:
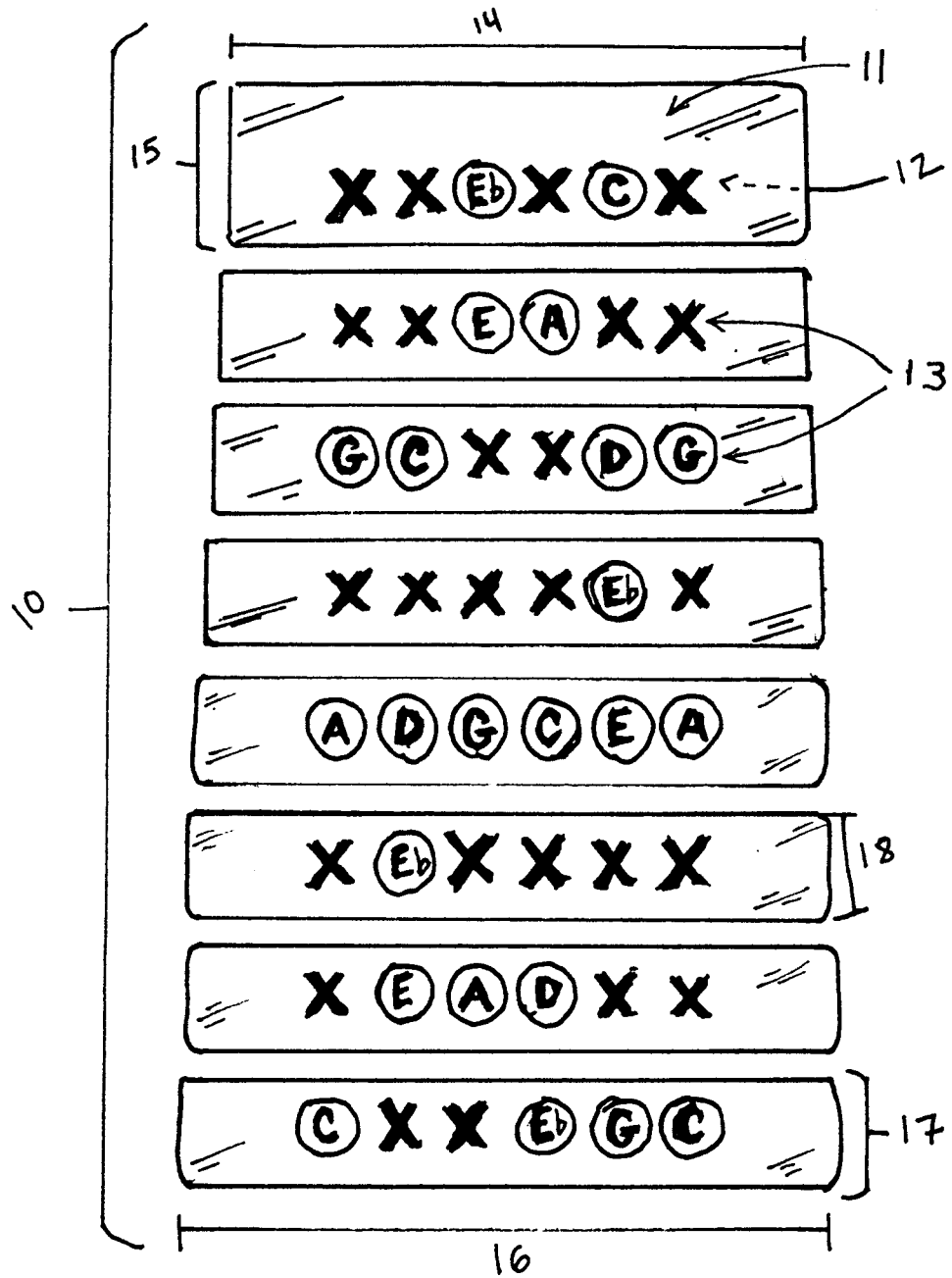

Having thus described the invention in general terms, reference will now be made to the accompanying drawings, which are not necessarily drawn to scale, and wherein:

FIG. 1 provides a frontal view of one embodiment of the present invention.

Figure 2:
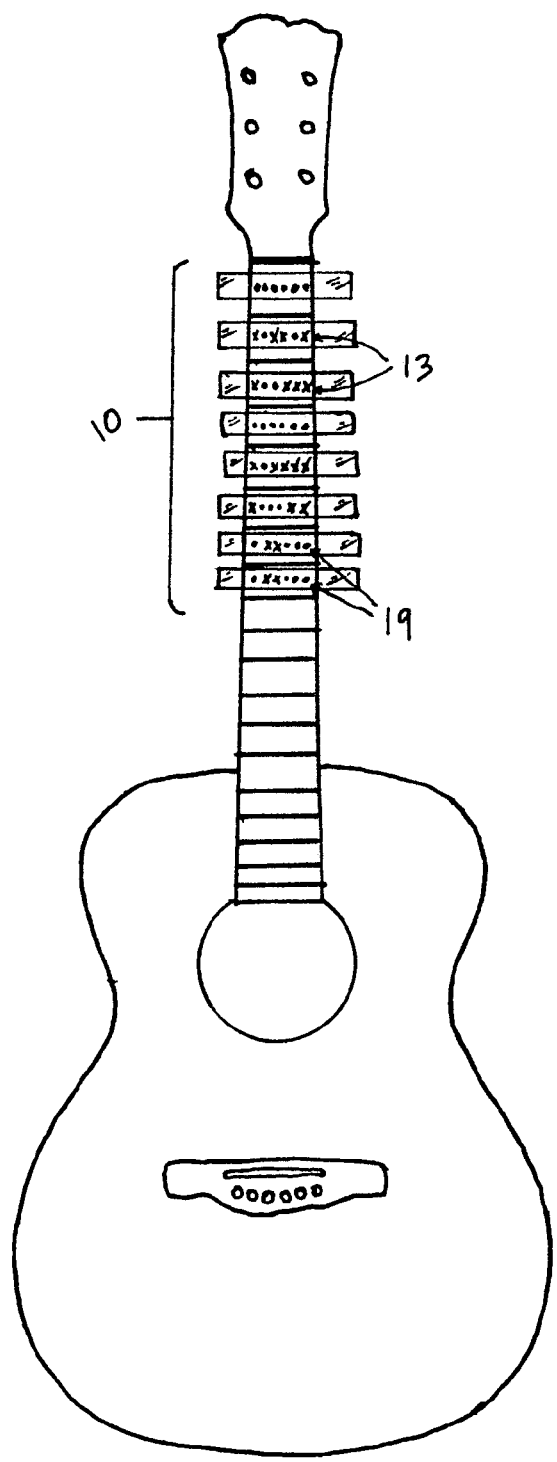

FIG. 2 provides a frontal view of one embodiment of the present invention properly aligned on the fretboard of a stringed instrument.

Figure 3:
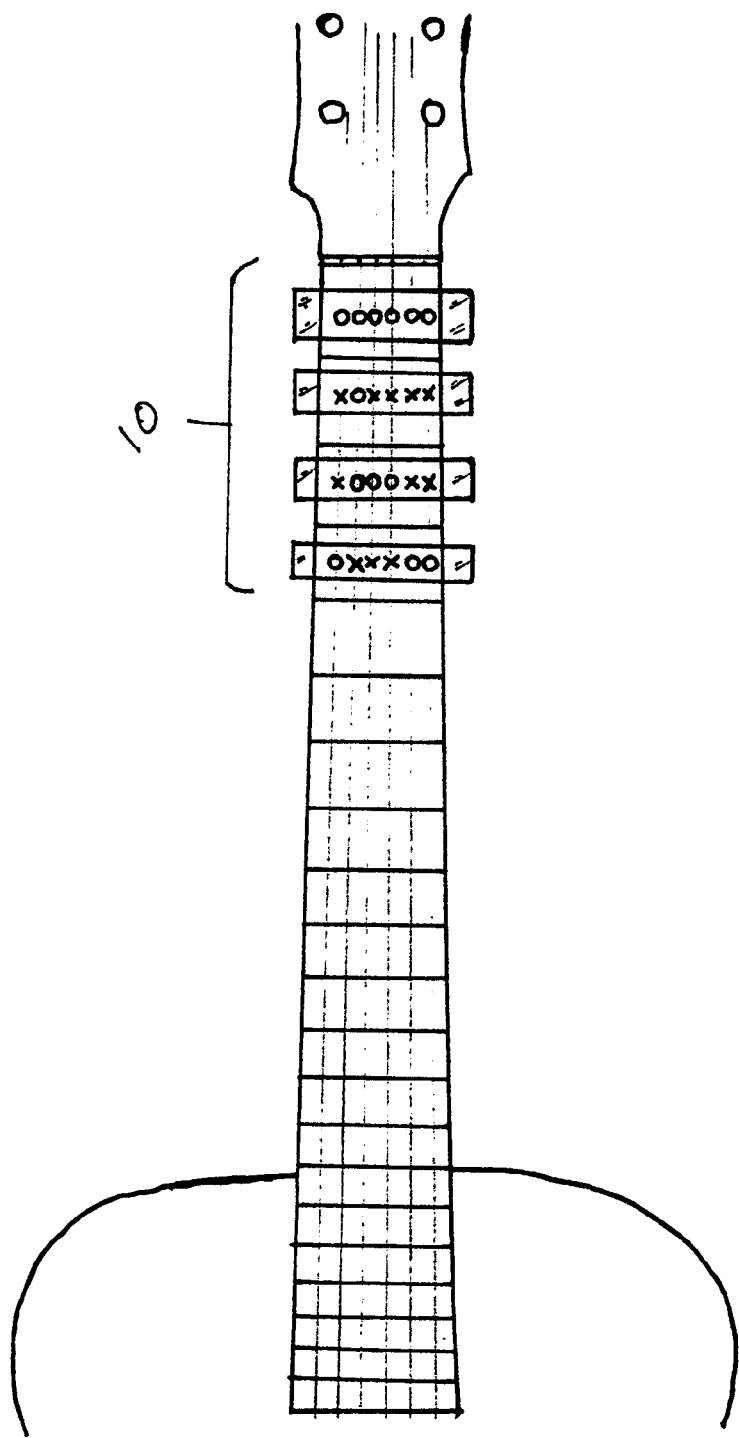

FIG. 3 provides a close-up frontal view of a stringed instrument with one embodiment of the present invention properly aligned and attached to its fretboard.

Figure 4:
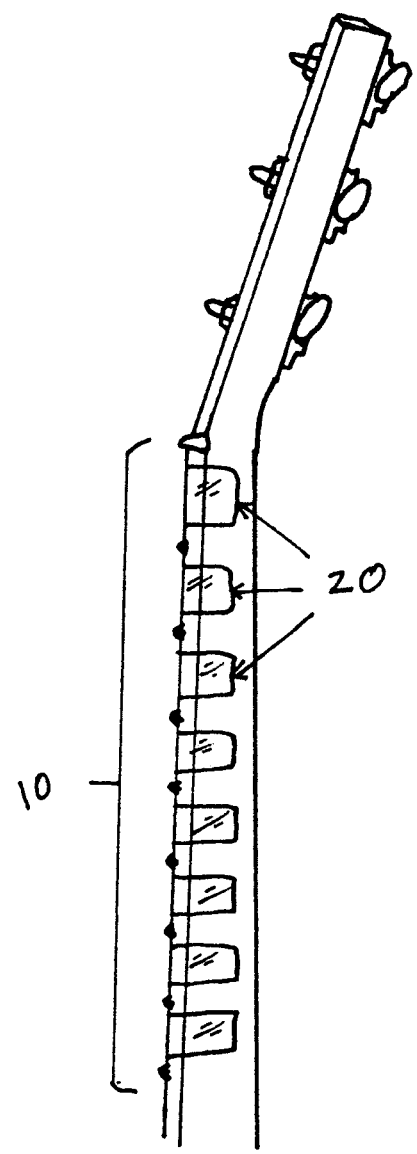

FIG. 4 provides a side view of a stringed instrument with one embodiment of the present invention properly aligned and attached to its fretboard.

The drawings are illustrative in nature and should not be construed as limiting the scope of the invention.

DETAILED DESCRIPTION OF THE INVENTION

The present invention consists of a set of removable stickers for fretted stringed instruments, each of which have a low-tack mild adhesive on the bottom but not the top surface as well as markings on the top surface that provide visual cues for players of stringed instruments. Each sticker is made of a thin, flexible material, such as vinyl and attaches directly to the fretboard of a fretted stringed instrument of choice and may be removed without damage to the instrument's substrates. The various markings on the top surface of each sticker provide visual cues of musical indicia to teach students the proper positioning of fingers for various chords, scales, notes, and other fretboard patterns.

FIG. 1 shows a frontal view of a preferred embodiment of the present invention that is applicable to a standard sized acoustic guitar. In this preferred embodiment, the set of removable stickers 10 comprises eight removable fretboard stickers having a rectangular or trapezoidal planar top surface 11 and a rectangular or trapezoidal planar bottom surface 12. Each sticker is made of a thin, flexible, but strong non-stretching material, such as vinyl or similar material. The material is preferably 3.5 mil, clear gloss flexible vinyl, but other materials may be used. The bottom surface of each sticker 12 is coated with an ultra low-tack removable adhesive, such as 64 ultra low-tack removable acrylic. Preferably, the target adhesion values of the adhesive used allow the stickers in the sticker set to be cleanly removed from most wood lacquered finishes for up to 6 months.

The top surface of each sticker 11 does not contain adhesive, but instead has markings 13, produced from a screen printing process or similar process capable of creating opaque markings on clear gloss material. In this preferred embodiment, the markings 13 include note names in some instances and other musical indicia in other instances. The note names may be produced using a variety of colors, however, the colors chosen will preferably be highly visible when the stickers are attached to a wide variety of fretboards. To protect the adhesive element used, a liner (not pictured) is affixed to the stickers until the stickers are ready to be applied to the fretboard. 90# polycoated bleached layflat may be used as the material of the liner, however, other materials may be used as well.

The preferred overall dimensions of each sticker will vary, depending on the instrument to which each sticker set pertains, however, a number of important limitations of said dimensions may be noted. The width of the sticker 14 to be placed between the frets closest to the head of the stringed instrument 15 ought to be smaller than the width of the sticker 16 to be placed between the frets furthest from the head of the stringed instrument 17 to account for the trapezoidal aspect of fretboards. Also, the height of each sticker 18 should be smaller than the distance between the frets to be covered by the sticker at issue. Finally, the width of each sticker 14, 17 should be limited to no more than is necessary to cover the entire width of the fretboard of the instrument where the sticker is to be attached, plus a small amount of space (no more than 2 cm) to grip the sides of the neck of the instrument. This limitation allows the player of the instrument to make natural contact to the surface of the back of the neck of the instrument with one's thumb even when the stickers are attached to the fretboard of the instrument.

FIG. 2 provides a frontal view of one embodiment of the present invention properly aligned and semi-attached to the fretboard of an acoustic guitar. Although no strings appear on this guitar, in this preferred embodiment, the markings 13, 19 on the sticker set would line up directly under the strings if strings did appear, although the player is free to deviate from this rule in applying the stickers. In this figure, the sticker set, comprising eight stickers, are affixed to the fretboard of the guitar, next to and, in some cases, between, each of the first 8 frets. The markings 13, 19 may include visual cues of musical indicia indicating where each fretboard sticker should be placed. This figure illustrates what the sticker set 10 may look like mid-application, after the stickers have been affixed to the front of the instrument's fretboard but before the sides of the stickers have been affixed to the sides of the neck of the guitar.

FIG. 3 pictures a closer frontal view of another embodiment of the present invention properly aligned and semi-attached to the fretboard of an acoustic guitar. In this view, the sticker set 10 includes only four stickers.

FIG. 4 illustrates a sticker set 10 once the individual stickers in the sticker set 10 have been fully attached. Now the sides of each sticker 20 have been affixed to the sides of the neck of the instrument and may remain so attached, preferably, for up to six months or longer without causing any damage to the instrument.

These figures, along with the accompanying descriptions demonstrate a unique, novel, and superior solution to the problem of providing visual cues for learning to play stringed instruments on the surface of the instrument itself. The present invention's ease of application, universal applicability, aesthetic appeal, streamline and simple design, and incremental application process cause it to be superior to all similar inventions, providing a substantial and significant improvement to all prior art.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The embodiments of the invention in which an exclusive property or privilege is claimed are:

1. A device comprising:
   a set of separate and numerically distinct stickers for a stringed instrument that provide temporary visual cues for learning portions of fretboard modes and patterns, wherein each sticker within the set is made from a thin, flexible, and strong material, wherein each sticker within the set includes at least one musical indicia indicating musical concepts, wherein the at least one musical indicia is printed using a plurality of highly visible colors, wherein a bottom surface of each sticker includes a low-tack removable adhesive for clean removal of each sticker from the stringed instrument for a period including six months or more without causing damage to the stringed instrument, wherein each sticker within the set has a width that covers only the fretboard and sides of a neck of the stringed instrument.

2. The device of claim 1, wherein the at least one musical indicia indicating musical concepts includes any of note locations, scales, root notes, and chords.

3. The device of claim 1, wherein the at least one musical indicia indicating musical concepts includes any of chords, notes, and scales of at least one entire song.

4. The device of claim 2, wherein each separate, and numerically distinct sticker consists of:
   a rectangular planar top surface having musical indicia indicating musical concepts; and
   a rectangular planar bottom surface, affixable to both the fretboard and the neck of the stringed instrument.

5. The device of claim 2, wherein each separate, and numerically distinct sticker consists of:
   a trapezoidal planar top surface having musical indicia indicating any of musical concepts, note locations, scales, root notes, and chords; and
   a trapezoidal planar bottom surface, affixable to both the fretboard and the neck of the stringed instrument.

6. The device of claim 1, wherein dimensions of each sticker in the set of stickers are such that the sticker fits between two uniquely coupled frets of a standard sized fretted instrument.

7. The device of claim 1, wherein the at least one musical indicia includes any of numbers and letters.

8. The device of claim 1, wherein the at least one musical indicia are any of colored indicia and black and white indicia.

9. The device of claim 1, wherein the low-tack removable adhesive is an ultra low-tack removable acrylic adhesive.

10. A method of affixing visual cues for recognizing musical indicia to a surface of a fretboard of a stringed instrument, the method comprising:
    providing at least one musical indicia indicating musical concepts on a set of separate and numerically distinct stickers, wherein the at least one musical indicia is printed using a plurality of highly visible colors, wherein a bottom surface of each sticker includes a low-tack removable adhesive for clean removal of each sticker from the stringed instrument for a period including six months or more without causing damage to the stringed instrument; and
    affixing the set of stickers to a surface of a fretboard of the stringed instrument to provide temporary visual cues for learning portions of fretboard modes and patterns, wherein each sticker within the set is made from a thin, flexible, and strong material, wherein each sticker within the set is placed one at a time, between frets and underneath strings of the stringed instrument, further wherein each sticker within the set has a width that covers only the fretboard and sides of a neck of the stringed instrument.

11. The method of claim 10, wherein the at least one musical indicia indicating musical concepts includes any of note locations, scales, root notes, and chords.

12. The method of claim 10, wherein the at least one musical indicia indicating musical concepts includes any of chords, notes, and scales of at least one entire song.

13. The method of claim 10, wherein the low-tack removable adhesive is an ultra low-tack removable acrylic adhesive.

\* \* \* \* \*